United States Patent [19]
Seeger et al.

[11] Patent Number: 5,666,841
[45] Date of Patent: Sep. 16, 1997

[54] METHOD FOR WORK-HARDENING BY ROLLING A COMPONENT

[75] Inventors: Horst Seeger; Dieter Thiele, both of Ruhr; Hans Wagner, Moers, all of Germany

[73] Assignee: Siemens Aktiengesellschaft, Munich, Germany

[21] Appl. No.: 532,167

[22] Filed: Sep. 22, 1995

[30] Foreign Application Priority Data

Mar. 22, 1993 [DE] Germany .................. 43 09 176.8

[51] Int. Cl.$^6$ .................................................. B21B 1/08
[52] U.S. Cl. .................................... 72/110; 29/DIG. 49
[58] Field of Search .............................. 72/75, 76, 102, 72/110, 111, 84, 85; 29/DIG. 49, 90.01

[56] References Cited

U.S. PATENT DOCUMENTS

| | | |
|---|---|---|
| 4,448,053 | 5/1984 | Holmstrom . |
| 5,099,558 | 3/1992 | Wilson .................. 29/90.01 |

FOREIGN PATENT DOCUMENTS

| | | |
|---|---|---|
| 2 486 432 | 1/1982 | France . |
| 38 713 | 8/1965 | German Dem. Rep. . |
| 869 912 | 3/1953 | Germany . |
| 36 01 541 | 7/1987 | Germany . |
| 40 15 205 | 8/1991 | Germany . |
| 54-412453 | 2/1972 | Japan . |
| 175367 | 9/1965 | Russian Federation ........... 72/84 |
| 1523317 | 11/1989 | Russian Federation ........... 72/110 |

OTHER PUBLICATIONS

Derwent Publ. 1987, 1 page, SU 1258–577–A, "Device for strengthening roots of gear teeth–has disc made".
Frauenhofer–Institut für Werkstoffmechanik Publication (Prümmer et al.), pp. 63–71, "Eigenspannungsausbildung".
Publication Berstein et al., pp. 89–115, "Festwalzen–Anwendungsbereich,Voraussetzung,Maschinen".
German Assoc.for Material Testing Publ.,Berlin 1983, (Broszeit),pp. 7–22,"Festwalzen und Glattwalzen . . . ".
Stahl u. Eisen Publ. 104 (1984) No.14, pp.657–660, (von Finckenstein et al.) "Eigenspannungen beim . . . ".
Institut für Werkstoffkunde, TH Darmstadt, pp.23–47, "Ermüdungseigenschaften festgewalzter Probestäbe".

*Primary Examiner*—Lowell A. Larson
*Attorney, Agent, or Firm*—Herbert L. Lerner; Laurence A. Greenberg

[57] ABSTRACT

A method for work-hardening a component to be loaded along a loading axis includes rolling in a notch extending approximately at right angles to the loading axis. The notch has a minimum radius of curvature to be determined in a cross-section parallel to the loading axis. The notch is work-hardened by rolling along a plurality of tracks being adjacent one another along the loading axis and being directed approximately at right angles to the loading axis, with each track covering only a part of the notch. Compressive internal stresses are generated which have axial components and tangential components relative to the loading axis. The axial components are substantially larger than the tangential components. The method is particularly suitable for work-hardening by rolling of a retention groove in a root part of a turbine blade.

13 Claims, 5 Drawing Sheets

METHOD FOR WORK-HARDENING BY ROLLING A COMPONENT

CROSS-REFERENCE TO RELATED APPLICATION

This application is a continuation of International Application PCT/DE94/00277, filed Mar. 15, 1994.

BACKGROUND OF THE INVENTION

FIELD OF THE INVENTION

The invention relates to a method for work-hardening a component to be loaded along a loading axis by rolling in a notch extending approximately at right angles to the loading axis, the notch being work-hardened by rolling along a plurality of tracks being adjacent to one another along the loading axis and being directed approximately at right angles to the loading axis, with each track covering only a part of the notch and compressive internal stresses being generated in the component below the notch.

The invention relates in particular to the work-hardening by rolling of metallic components such as turbine blades, where a notch in which such a component is to be work-hardened by rolling is, in particular, a retention groove for holding the component. A turbine blade, in particular, which is intended for a turbine rotor and is correspondingly subjected to large operational centrifugal loads, frequently has a plurality of retention grooves which are disposed along the loading axis in two mutually symmetrical rows and in which corresponding holding appliances of the turbine rotor engage.

Component work-hardening by rolling is summarized under the general term "surface precision rolling" together with finish-rolling which smooths the surface and dimensional rolling which slightly changes the shape. The term "surface precision rolling" is thoroughly explained in a book entitled "Festwalzen und Glattwalzen zur Festigkeitssteigerung von Bauteilen" [Hard-Rolling and Smooth-Rolling to Increase the Strength of Components] of the Deutschen Verbands für Materialprüfung e.V. [German Association for Material Testing]. Written versions or manuscripts of lectures which were given at the eighth "Arbeitskreises Betriebsfestigkeit" [Task Force on Operating Strength] meeting held in 1982 are collected in that book. Individual reference is made herein to the lectures "Erm üdungseigenschaften festgewalzter Probestäbe" [Fatigue Properties of Hard-Rolled Test Bars] by B. Fuchsbauer, Page 23 ff, and "Eigenspannungsausbildung und Dauerfestigkeit von festgewalzten CK45-Proben" [Intrinsic Stress Development and Long-Term Strength of Hard-Rolled Specimens of CK 45] by R. Prümmer and R. Zeller, Page 63 ff. It can be learned from those sources that work-hardening by rolling, which is usually carried out with small, hard metal crowned rollers, is a treatment in which the surface is deformed with the objective of increasing the life, in particular the endurance under vibration crack corrosion attack. During work-hardening by rolling, the surface deformation is partly elastic and partly plastic. On one hand, it leads to an increase in the hardness of the treated material at the surface and in the layers close to the surface and on the other hand, it leads to the formation of compressive internal stresses under the surface. Under certain circumstances, those compressive internal stresses are suitable for preventing crack growth from the surface into the material. The suitability of compressive internal stresses for combatting vibration crack corrosion on the material follows therefrom.

The avoidance of danger due to vibration crack corrosion is an important aspect in the planning and manufacture of a turbine blade for a gas turbine or a steam turbine.

A method for work-hardening by rolling of the type mentioned in the introduction above is apparent from German Patent DE 40 15 205 C1, in which the component with a notch to be treated through the use of work-hardening by rolling is a turbine blade. The main feature in that case is not an embodiment of the work-hardening by rolling itself, but rather information on a tool that is suitable for the work-hardening by rolling of certain notches or grooves.

German Patent DE-PS 869 912 also relates to the process of work-hardening by rolling although it is not a component of the type mentioned in the introduction above which is work-hardened by rolling, but rather a flat circular ring representing a race of a rolling contact thrust bearing.

German Published, Non-Prosecuted Application DE 36 01 541 A1 relates to an improvement in the surface properties at a hole in a work piece through the use of work-hardening by rolling the surface at the hole with rolling balls. The work-hardening by rolling preferably takes place in such a way that the balls are guided along the axis of the hole and therefore roll over the hole on a multiplicity of tracks which are adjacent one another with each of them being directed approximately parallel to the axis. Compressive internal stresses, a substantial proportion of which are tangentially directed relative to the axis, can be generated in the work piece in that way.

The work-hardening by rolling of a notch in a component, which is known from the state of the art, always takes place in such a way that a crowned roller with a shape being matched to the shape of the notch is rolled through the notch with a corresponding contact force. It has been found that compressive internal stresses are then formed which are anisotropic and a major proportion of which are directed in the longitudinal direction of the notch. Those compressive internal stresses are therefore only suitable to a limited extent for combatting the operational loads on components of the type mentioned in the introduction above, in particular turbine blades, in which the loading takes place along a loading axis extending transverse to the notch.

SUMMARY OF THE INVENTION

It is accordingly an object of the invention to provide a method for work-hardening a component to be loaded along a loading axis by rolling in a notch extending approximately at right angles to the loading axis, which overcomes the hereinafore-mentioned disadvantages of the heretofore-known methods of this general type and which achieves better orientation of compressive internal stresses in terms of loads to be expected.

With the foregoing and other objects in view there is provided, in accordance with the invention, in a method for work-hardening a component to be loaded along a loading axis, which includes rolling in a notch extending approximately at right angles to the loading axis, work-hardening the notch by rolling along a plurality of mutually adjacent tracks along the loading axis being directed approximately at right angles to the loading axis, covering only a part of the notch with each track and generating compressive internal stresses in the component below the notch, the improvement which comprises work-hardening the adjacent tracks by rolling with the tracks overlapping one another, for generating the compressive internal stresses with axial components and tangential components relative to the loading axis and with the axial components being substantially larger than the tangential components.

The invention is based on the knowledge that it is possible to achieve 90° rotation of the compressive internal stresses through the use of work-hardening by rolling on adjacent tracks, each of which only covers part of the notch, so that the compressive internal stresses being initially directed approximately at right angles to the loading axis are directed towards the loading axis after the work-hardening by rolling has been completed. These compressive internal stresses are therefore particularly suitable for intercepting loads which occur along the loading axis. Therefore, it is possible to effectively combat crack growth and vibration crack corrosion in the notch, particularly in the case of turbine blades.

According to the invention the tracks for work-hardening the notch by rolling are placed in such a way that they overlap one another. In this way, interactions between compressive internal stresses which have already been generated and compressive internal stresses which are generated by a fresh rolling process can be used for supporting the development of the desired compressive internal stresses after the work-hardening by rolling has been completed. In addition, a substantially smooth notch surface has already been achieved during the work-hardening by rolling.

The statement that the compressive internal stresses are to have certain properties "under the notch" also has the meaning that a small surface region in the notch has to be left out of consideration. This region, from the surface down to a small depth, typically amounts to approximately 0.2 mm in the case of a work piece being formed of steel. This is the main explanation for the fact that the surface region is subjected to particularly intensive working due to the formation and rolling down of fins, in a manner different from the deeper layers. This working influences and determines the material properties of the surface region in a manner which it is almost impossible to appreciate. The main characteristic, therefore, is the influencing of layers below the surface region, although this is sufficient from the point of view of avoiding crack growth.

In accordance with another mode of the invention, the work-hardening by rolling of the component takes place such a way that the axial components of the compressive internal stresses are approximately 50% larger than the tangential components of the compressive internal stresses down to a depth of 0.6 mm.

In accordance with a further mode of the invention, the axial components of the compressive internal stresses have magnitudes of approximately 500 Newton/mm$^2$ which extends down to a depth of 1.5 mm.

Each of the measures mentioned above, and preferably both measures in combination, ensure compressive internal stresses with properties which, particularly in the case of a turbine blade, are effective in preventing crack formation and vibration crack corrosion under the loads to be expected.

In accordance with an added mode of the invention, each track covers a maximum of one-sixth of the notch so that, in fact, a large number of rolling processes is necessary in order to work-harden the notch completely by rolling. This also supports the objective of generating the desired compressive internal stresses, in a particular manner.

In accordance with an additional mode of the invention, the work-hardening by rolling takes place in such a way that each track is rolled over by a crowned roller which has a maximum crown radius that is substantially smaller than the minimum radius of curvature of the notch. A single roller, which is guided over all of the tracks one after the other, can then be used for work-hardening the notch by rolling. However, it is also conceivable to use configurations with a plurality of rollers, of the type mentioned above, for work-hardening the notch by rolling. The measure just mentioned above is preferentially employed for the work-hardening by rolling of a notch with a relatively complicated cross section.

In accordance with yet another mode of the invention, the notch is to be finish-rolled in addition after the work-hardening by rolling. This can take place through the use of a single roller which covers the notch over the whole of the region that has been work-hardened by rolling and which has a shape that is adequately matched to the shape of the notch. Smaller irregularities of the surface of the component within the notch can be obviated by the finish-rolling so that the quality of the surface can be even further improved, particularly with respect to its corrosion-resistance.

In accordance with yet a further mode of the invention, the finish-rolling takes place through the use of a roller which simultaneously covers a plurality of tracks. In particular, fins which may have formed between adjacent tracks during the work-hardening by rolling, can therefore be obviated and it is possible to ensure, by using a simple device, that the force with which the roller acts on the notch during the finish-rolling has an appropriate relationship to the force acting during the work-hardening by rolling. It is useful for the pressure exerted on the notch during the finish-rolling to be markedly smaller than the pressure during work hardening by rolling. Covering all of the tracks in the notch simultaneously during the finish-rolling is particularly preferred so that the finish-rolling is effected by a single application of the roller that is intended for this purpose. If necessary, this roller can be guided several times over the notch. In all cases, a smooth notch surface can be achieved, with a simple device and with little complication, subsequent to the work-hardening by rolling in accordance with the invention.

In accordance with yet an added mode of the invention, any embodiment of the method is particularly suitable for the work-hardening by rolling of a notch in a component being formed of metal, in particular in a component which is formed of steel, for example chromium steel. The steel X20Cr13 is particularly interesting as the chromium steel. This steel is particularly used in many cases for turbine blades. Other metals of which the components to be treated according to the invention can be formed, are titanium and titanium alloys. The application of the method according to the invention is particularly important in a component being formed of high-strength material, in particular high-strength steel or high-strength titanium alloy.

In accordance with yet an additional mode of the invention, the method according to the invention is particularly suitable for a turbine blade with the notch being a retention groove in particular.

In accordance with a concomitant mode of the invention, on a turbine blade in particular, the method is used with particular advantage in such a way that two opposite retention grooves are work-hardened by rolling simultaneously. This is associated with a savings of work, because two notches are treated simultaneously, and a savings in apparatus because two rollers, one for each retention groove, mutually support one another and permit special support devices to be omitted. In addition, a certain symmetry is achieved in the compressive internal stresses being simultaneously generated in the retention grooves that are work-hardened by rolling and this makes a further contribution to the objective of generating resistance to crack growth and vibration crack corrosion.

Other features which are considered as characteristic for the invention are set forth in the appended claims.

Although the invention is illustrated and described herein as embodied in a method for work-hardening by rolling a component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
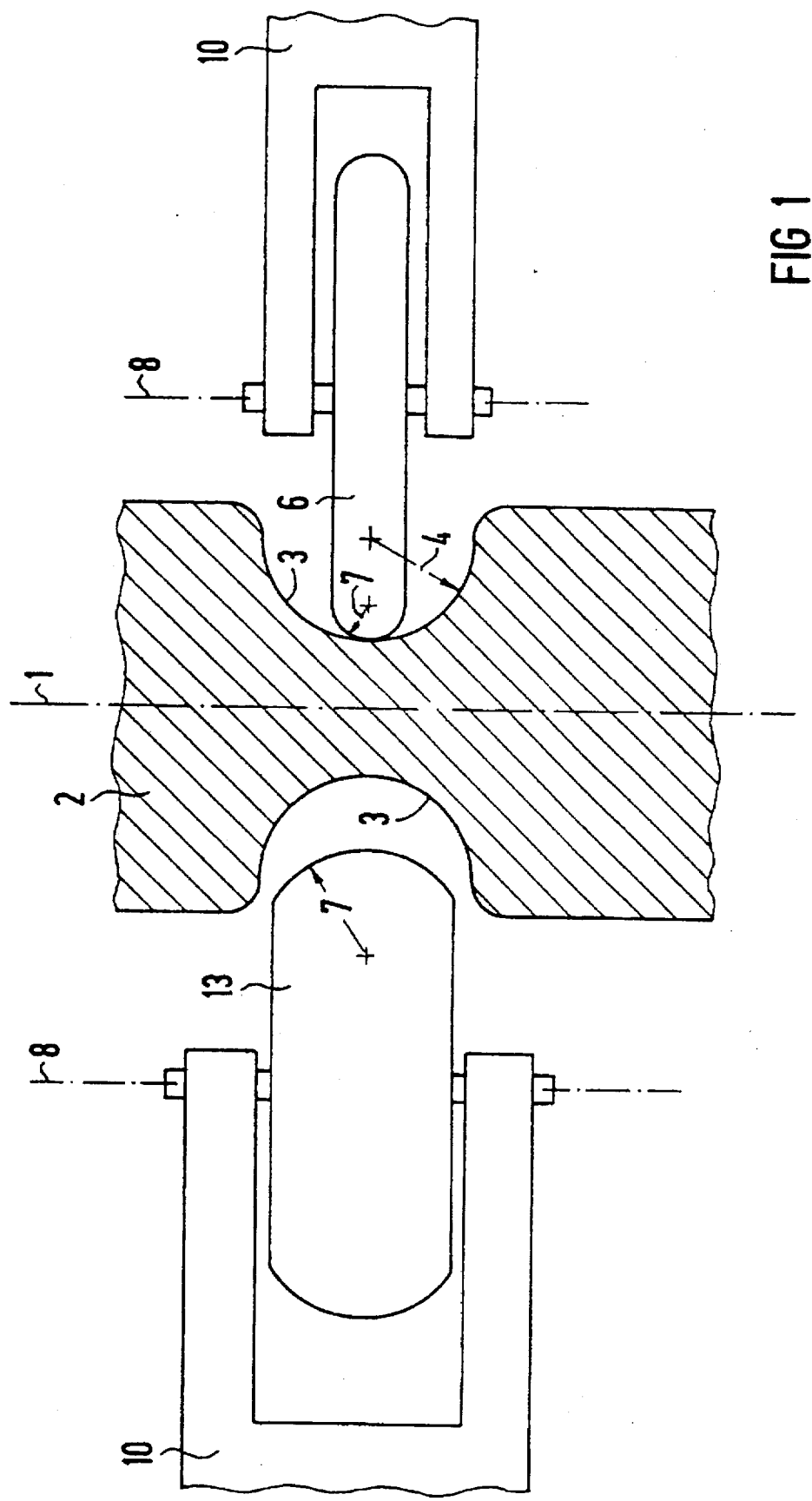
FIG. 1 is a fragmentary, diagrammatic, partly sectional view of a configuration having a component with notches to be work-hardened by rolling, together with rollers for work-hardening and finish-rolling.

Referring now to the figures of the drawing in detail and first, particularly, to FIG. 1 thereof, there is seen a component 2, which is to be able to accept load along a loading axis 1 and which has two notches 3 that are intended to extend transverse to the loading axis 1, i.e. out of the plane of the drawing and into the plane of the drawing. A cross-section which is parallel to the loading axis 1, in particular a radial/axial cross-section, may also be seen. Each notch 3 has a minimum radius of curvature 4 which simply corresponds to the radius of curvature of the circular notch 3, in the cross-section shown in the illustrated example. The component 2 is work-hardened by rolling in the sense of the invention at the notch 3 shown on the right, through the use of an appropriate roller 6. The roller 6 is crowned, i.e. it is rounded on its external periphery, and has a maximum crown radius 7 which simply corresponds to the radius of curvature of the roller 6 in the illustrated example, because the roller 6 has a torroidal profile. This radius of curvature is markedly smaller than the minimum radius of curvature 4 of the notch 3. Consequently, multiple rolling by the roller 6 is necessary for complete work-hardening by rolling in the notch 3 or at least for work-hardening by rolling of all of the positions along the notch 3 which are of interest for this purpose. A holder 10 in which the roller 6 is held can, for example, include a device for feeding along the loading axis 1 for this purpose. The roller 6 can be rotated about an axis of rotation 8. A roller 13 is shown on the left-hand side for comparison purposes. This roller 13 has a maximum crown radius 7 which corresponds approximately to the minimum radius of curvature 4 of the notch 3. The roller 13 can be used to subject the notch 3 to finish-rolling after the work-hardening by rolling has taken place. This finish-rolling is used particularly for smoothing the surface of the notch 3, which can be important for a further improvement in quality. The roller 13 can likewise be rotated on an axis of rotation 8 and it is likewise fastened in an associated holder 10. If necessary, the roller 13 can also be used for work-hardening by rolling in accordance with the prior art.

Figure 2:
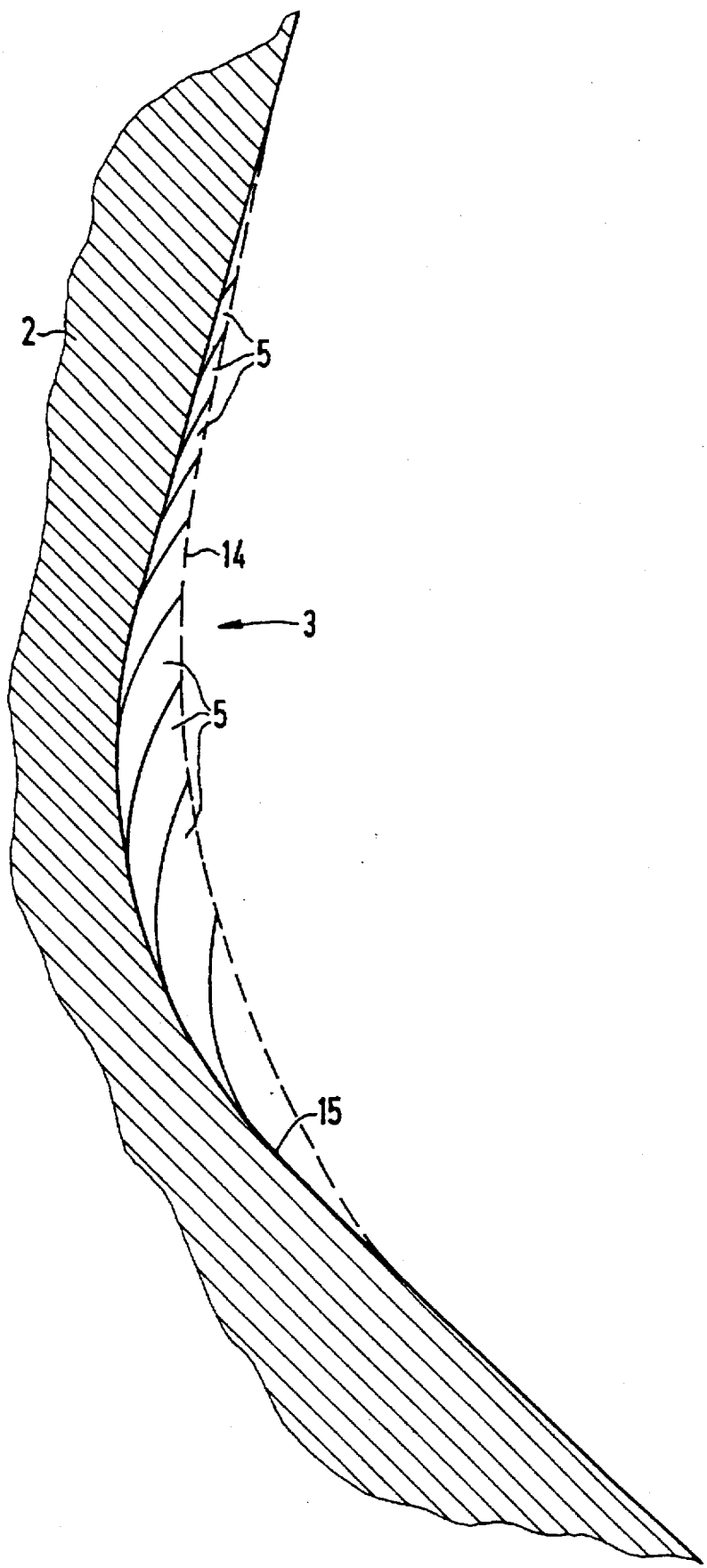
FIG. 2 is an enlarged, fragmentary, cross-sectional view showing a comparison between a notch before and after the work-hardening by rolling.

FIG. 2 shows, on a suitably larger scale, a change in shape which a notch 3 in a component 2 experiences due to work-hardening by rolling. Before the work-hardening by rolling, the notch 3 has an initial contour 14 indicated by a broken line. During the course of the work-hardening by rolling, this initial contour 14 is reshaped to a final contour 15 bounding or demarking a shaded area. The work-hardening by rolling takes place through the use of the roller 6 (which is not shown in FIG. 2) rolling over the component 2 at the notch 3 on many adjacent tracks 5 which partially overlap one another. The rolling of the notch 3 continually effects a certain change in shape and all of the changes in shape which are effected through the use of the work-hardening by rolling are represented in FIG. 2. On one hand, the changes in shape involve a certain hardening of the deformed surface and on the other hand, they involve the formation of compressive internal stresses under the deformed surface. Due to the work-hardening by rolling over the many adjacent tracks 5, a particularly favorable distribution and direction of the compressive internal stresses can be achieved, as is explained in more detail below. As may be recognized from FIG. 2, the deformation of the notch 3 from track 5 to track 5 can vary and for this purpose, the force with which the roller 6 (see FIG. 1) in particular is pressed onto the notch 3 can be varied. Through the use of this measure, both the shape of the final contour 15 and the distribution of the hardness and compressive internal stresses can be sensitively matched to the requirements which are set, in particular to the requirements which are to be set in the sense of the invention.

Figure 3:
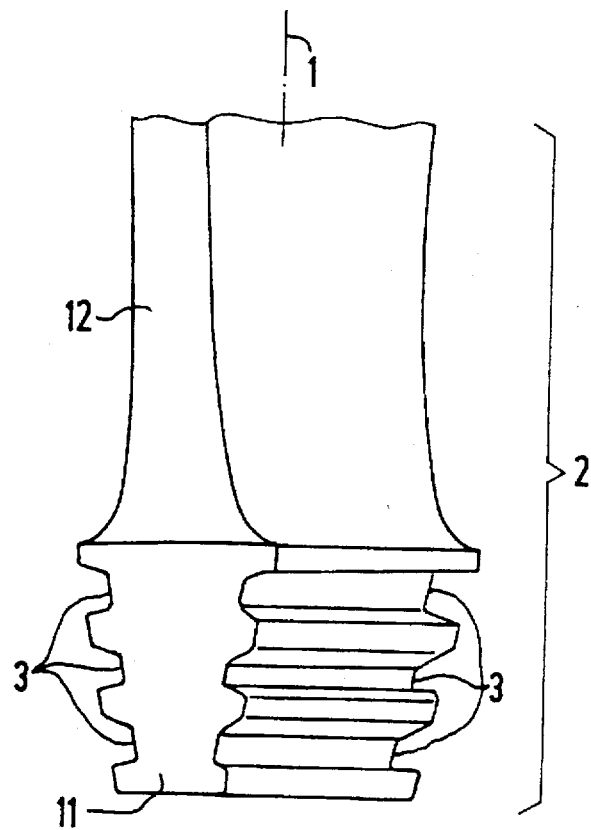
FIG. 3 is a fragmentary, elevational view of a turbine blade.

FIG. 3 shows a turbine blade 2 with an aerofoil or blade portion 12 (that is only partially represented), past which a flow medium flows during operation, and a root or base part 11, which is to be fixed in a rotor of a turbine. For this purpose, the root part 11 has notches 3 which are used as retention grooves and engage in corresponding complementary parts. It is these notches 3, in particular, which are to be considered for work-hardening by rolling in the manner described. The loading axis 1 extends in the longitudinal direction of the aerofoil 12 and the retention grooves 3 are directed approximately at right angles to the loading axis 1.

Figure 4:
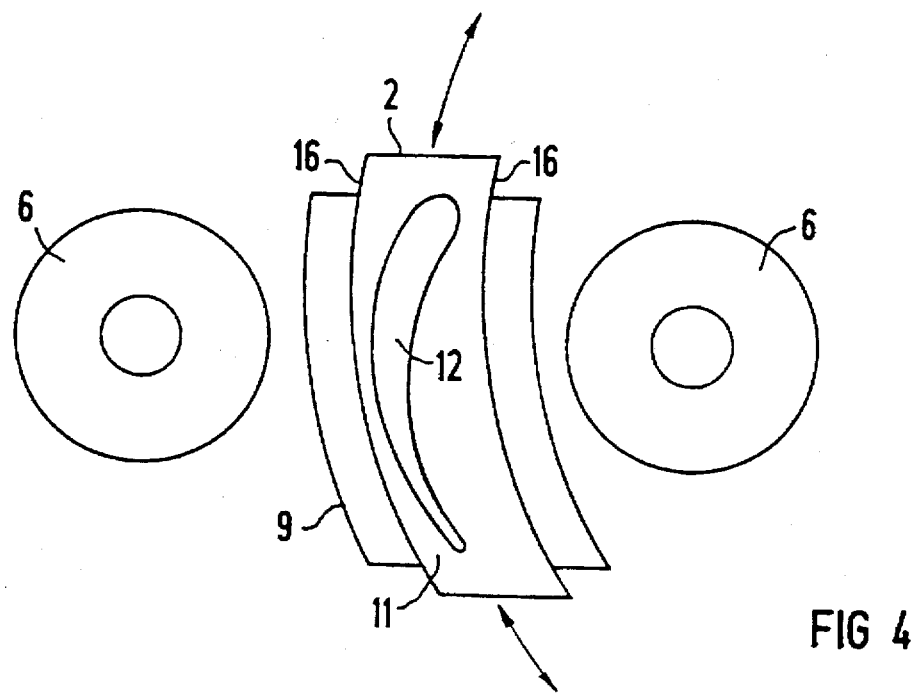
FIG. 4 is an elevational view showing a configuration for work-hardening a notch on a turbine blade by rolling.

FIG. 4 uses a view along the loading axis 1 to show how a turbine blade 2 with a root part 11 and an aerofoil 12 can be work-hardened by rolling in the retention grooves 3 (which are not shown in FIG. 4). For this purpose, the root part 11 is clamped in a holder 9. The root part 11 has a contour at right angles to the loading axis 1 with two curved sides 16 in which the notches 3 are also located. Such curved sides 16 are occasionally used in the case of turbine blades 2 which are intended for the final stages of low-pressure steam turbines. These turbine blades 2 are subjected to particularly high mechanical loads during operation and these loads can be intercepted particularly well through the use of such curved sides 16. The mutually opposite rollers 6 are pressed simultaneously into the curved sides 16 for the purpose of work-hardening by rolling and appropriate holders and devices for generating the necessary forces are provided for this purpose. The turbine blade 2 is pivoted or swiveled between the two rollers 6 along the arrows. In this way, the rollers 6 support one another and special support devices for the turbine blade 2 can be omitted.

Figure 5:
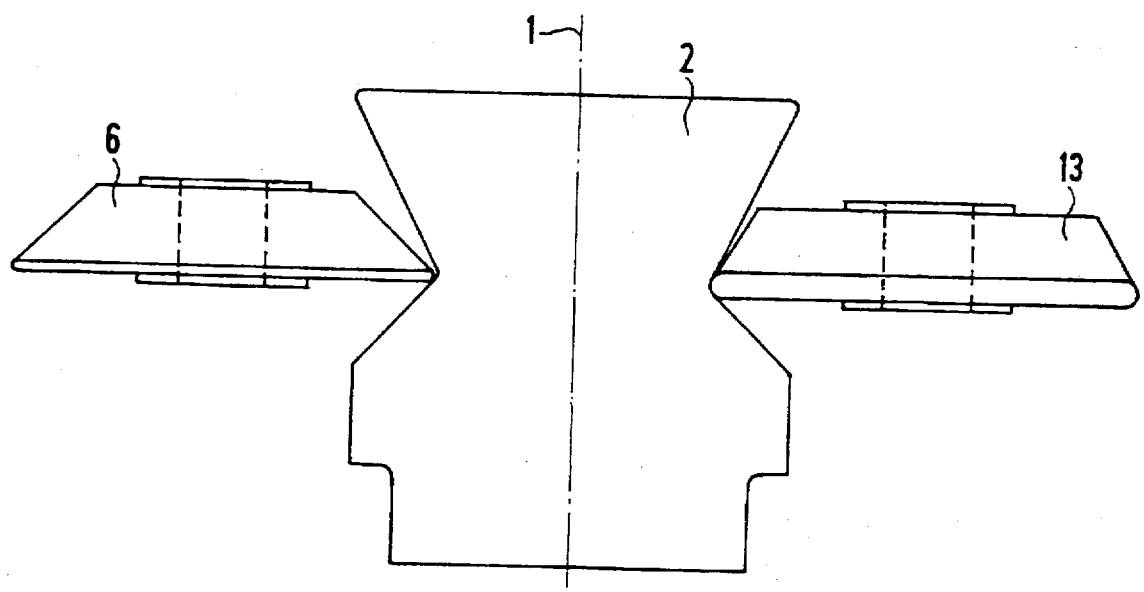
FIG. 5 is an elevational view showing a configuration similar to that shown in FIG. 1.

FIG. 5 shows a configuration which is similar to the configuration which can be recognized from FIG. 1 and in which the component 2 is a test piece representing a turbine blade. The course of the loading axis 1 is also indicated. On the left-hand side, a roller 6 rolls over the test piece. This roller 6 acts on the component 2 through the use of a relatively small radius of curvature and is correspondingly intended for the work-hardening by rolling according to the invention. On the right-hand side, a roller 13 rolls over the component 2 and has a significantly larger maximum crown radius which can correspondingly be used for finish-rolling or for representing (in association with FIG. 7 which is described below) that which was previously achievable through the use of work-hardening by rolling in accordance with the prior art. In the case of the examples described below, a roller 6 rolls over the component 2 which is formed of the material X20Cr13. This roller 6, that has a torroidal region having a radius of 1.5 mm which therefore corresponds to the maximum crown radius, acts on the component 2 and has a diameter of 138.5 mm. The component 2 is rolled on eleven tracks having centers which are 0.5 mm apart. The force with which the roller 6 is pressed onto the component 2 varies from track to track between 2.8 kN and 25 kN, respectively corresponding to a pressure exerted on the component 2 of between 14 bar and 125 bar. As a comparison, a roller 13 rolls over the component on the right-hand side and this roller, having a torroidal region with a radius of curvature of 3.8 mm, acts on the component 2. In the case of six rolling operations, forces of 10 kN, 20 kN and 30 kN are respectively exerted twice. The diameter of the roller 13 is likewise 138.5 mm.

Figure 6:
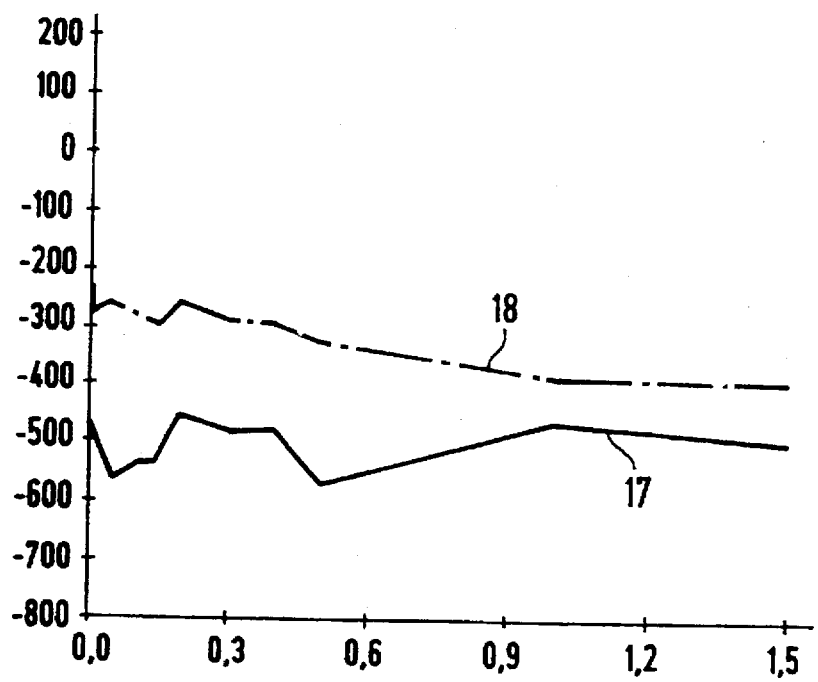
FIG. 6 is a diagram of compressive internal stresses being generated according to the invention in the configuration shown in FIG. 5.

FIG. 6 shows compressive internal stresses 17, 18 which are generated in the component 2 through the use of the method according to the invention and which are plotted against depth (as measured from the final contour). It may be clearly recognized that down to a depth of 1.5 mm and beyond, axial components 17 have markedly larger magnitudes than tangential components 18. Down to a depth of 0.6 mm, the axial components 17 are greater than the tangential components 18 by approximately 50% and the axial components have magnitudes of approximately 500 N/mm² down to a depth of 1.5 mm. The compressive internal stress data in FIG. 6 are provided as negative values. Positive values on the ordinate would correspond to tensile internal stresses.

Figure 7:
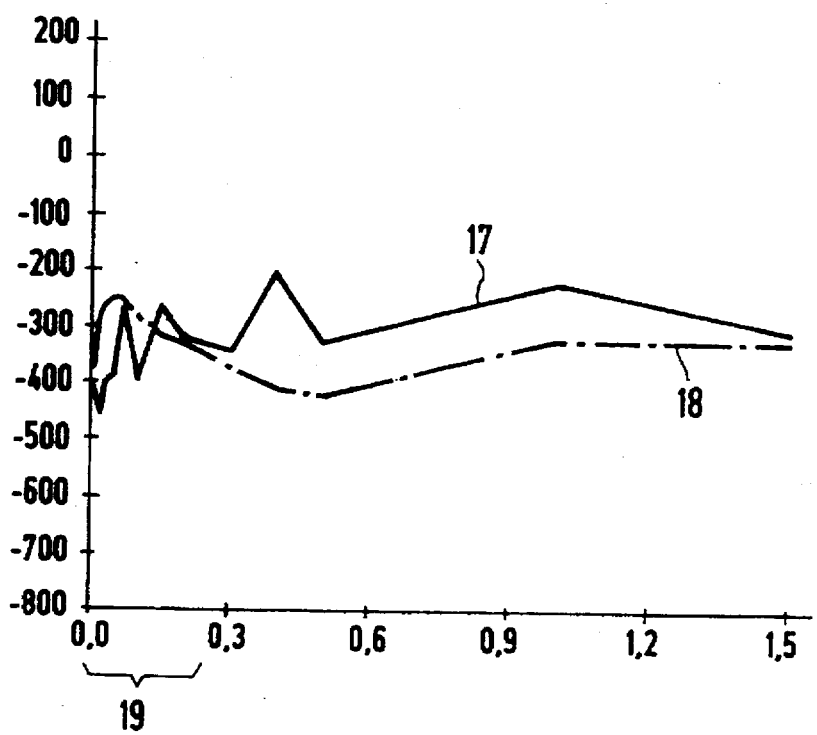
FIG. 7 is a diagram showing compressive internal stresses being generated according to the prior art in the configuration shown in FIG. 5.

As a comparison, FIG. 7 shows compressive internal stresses 17, 18 which were generated through the use of the roller 13 (seen in FIG. 5). Outside a small surface region 19, which extends from the surface down to a depth of approximately 0.2 mm, the magnitudes of the axial components 17 of the compressive internal stresses are always smaller than the magnitudes of the tangential components 18. Furthermore, in the surface region 19, the axial components 17 are subjected to substantial fluctuations so that it is not possibly to speak of a symmetrical tendency in that region. The essential properties of the method according to the invention are made very clear by the comparison of FIGS. 6 and 7, in particular. Accordingly, through the use of the invention, it is possible for the first time to influence the direction and, as the comparison shows clearly, also the magnitude of the compressive internal stresses in the component 2, through a suitable embodiment of the work-hardening by rolling, and to obtain magnitudes and directions which are matched in a particular manner to the expected loads on the component 2.

We claim:

1. In a method for work-hardening a component to be loaded along a loading axis, which includes:

rolling in a notch extending approximately at right angles to the loading axis, work-hardening the notch by rolling along a plurality of mutually adjacent tracks along the loading axis being directed approximately at right angles to the loading axis, covering only a part of the notch with each track and generating compressive internal stresses in the component below the notch, the improvement which comprises:

work-hardening the adjacent tracks by rolling with the tracks overlapping one another, for generating the compressive internal stresses with axial components and tangential components relative to the loading axis and with the axial components being substantially greater than the tangential components.

2. The method according to claim 1, which comprises carrying out the step of work-hardening by rolling with a force causing the axial components in the component to be approximately 50% greater than the tangential components down to a depth of 0.6 mm below the notch.

3. The method according to claim 1, which comprises carrying out the step of work-hardening by rolling with a force causing the axial components in the component to have magnitudes of approximately 500 N/mm² down to a depth of 1.5 mm below the notch.

4. The method according to claim 1, which comprises covering a maximum of one-sixth of the notch with each track.

5. The method according to claim 1, which comprises rolling over each track with a crowned roller having a maximum crown radius being substantially smaller than a minimum radius of curvature of the notch to be determined in a cross-section parallel to the loading axis.

6. The method according to claim 1, which comprises finish-rolling the notch after the work-hardening by rolling.

7. The method according to claim 6, which comprises finish-rolling the notch with a roller simultaneously covering a plurality of the tracks.

8. The method according to claim 6, which comprises finish-rolling the notch with a roller simultaneously covering all of the tracks.

9. The method according to claim 1, which comprises carrying out the rolling step by rolling a component formed of a metal.

10. The method according to claim 1, which comprises carrying out the rolling step by rolling a component formed of a metal selected from the group consisting of steel, titanium and a titanium alloy.

11. The method according to claim 1, which comprises carrying out the rolling step by rolling a turbine blade.

12. The method according to claim 11, which comprises rolling in a retention groove on the turbine blade as the notch.

13. The method according to claim 11, which comprises rolling in two mutually opposite retention grooves in the turbine blade as notches in which work-hardening by rolling takes place simultaneously.

* * * * *

UNITED STATES PATENT AND TRADEMARK OFFICE
CERTIFICATE OF CORRECTION

PATENT NO. : 5,666,841
DATED : September 16, 1997
INVENTOR(S) : Horst Seeger et al.

It is certified that error appears in the above-identified patent and that said Letters Patent is hereby corrected as shown below:

On the title page:

(adding item 63)
Item [63] should read as follows:

Continuation of PCT/DE94/00277, March 15, 1994.

Signed and Sealed this

Thirty-first Day of March, 1998

Attest:

BRUCE LEHMAN

Attesting Officer

Commissioner of Patents and Trademarks